Oct. 10, 1967   P. CANNON   3,346,337
HIGH DENSITY MAGNESIUM COMPOUNDS AND THEIR PREPARATION
Filed Oct. 10, 1963

Inventor:
Peter Cannon,

His Attorney.

United States Patent Office
3,346,337
Patented Oct. 10, 1967

3,346,337
HIGH DENSITY MAGNESIUM COMPOUNDS AND THEIR PREPARATION
Peter Cannon, Alplaus, N.Y., assignor to General Electric Company, a corporation of New York
Filed Oct. 10, 1963, Ser. No. 315,327
7 Claims. (Cl. 23—204)

ABSTRACT OF THE DISCLOSURE

High density, hexagonal lattice forms of $Mg_2Si$, $Mg_2Ge$ and $Mg_2Sn$ and the method for the preparation of each material from the face-center cubic form by the simultaneous application of high temperature and pressure thereto are described. Resistance to attack from the moisture of the atmosphere and the exhibition of both paramagnetism and photo-conductivity are set forth as unobvious useful properties of these new materials in constrast to the face-center cubic analogs thereof.

---

This invention relates to high density forms of magnesium compounds and more particularly to a stable form of each of these magnesium compounds having a density significantly above the density of the ordinary forms; namely, the silicon ($Mg_2Si$), the germanium ($Mg_2Ge$), and the tin ($Mg_2Sn$) compounds of magnesium.

Accordingly, it is an object of this invention to provide a new, high density form of magnesium silicide.

It is another object of this invention to provide a new, high density form of magnesium germanide.

It is still another object of this invention to provide a new, high density form of magnesium stannide.

It is a further object of this invention to modify the physical, chemical and/or electrical properties of the silicon, germanium, and tin compounds of magnesium and to increase to a considerable extent the resistance of these compounds to attack from atmospheric moisture.

In general, this invention comprises subjecting the commonly known silicon, germanium, and tin compounds of magnesium to very high pressures and temperatures to cause a transition of each of these magnesium compounds to a stable, higher density form considerably more resistant to attack by atmospheric moisture than the parent materials.

The low density forms of these materials, that is the parent materials, all possess highly desirable electronic properties but these properties are largely unavailable to the art because of the propensity of each of these materials to decompose when exposed to atmospheric moisture. Both the parent materials and the high density forms of these magnesium compounds are semiconductors (materials having an electrical resistance in the range of from about $10^{-1}$ ohm-cm. to about $10^6$ ohm-cm.) but, while the parent materials have only limited usage, the high density forms resistant as they are to atmospheric moisture are likely materials for the formation of transistors. Also each of these magnesium compounds in its high density form is a photo-conductor and therefore useful in the manufacture of photo-electric eyes and exposure meters for measuring light intensities. Although in every case neither of the parent materials forming these magnesium compounds exhibit paramagnetic qualities, the new phases disclosed herein do have paramagnetic qualities. Ordinarily, only compounds or alloys of the transition metals are paramagnetic and finding this quality exhibited in a semi-conducting material is unusual suggesting the use of these new phases for detecting the presence of ferro-magnetic materials.

This invention will be better understood when taken in connection with the following description and drawing in which.

Figure 1:
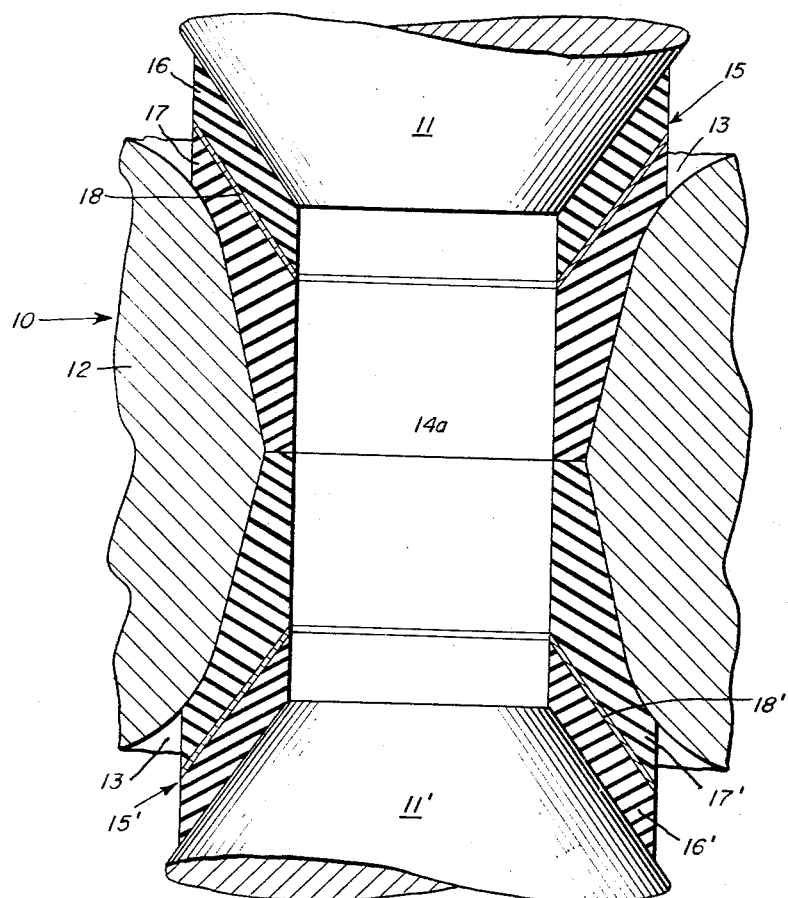
FIG. 1 is an elevational view of a preferred high pressure apparatus utilized in the practice of this invention.

The preferred form of high pressure, high temperature apparatus shown in the drawing is the subject of U.S. Patent 2,941,248—Hall. This apparatus 10 includes a pair of punches 11 and 11' and an intermediate "belt" or die 12. Each punch is surrounded by a plurality of press-fitted binding rings (not shown), which reinforce the punches, and a soft steel outer safety ring (not shown). Die member 12 includes an aperture 13 in which there is positioned a reaction vessel 14. Between each punch 11 and 11' and die 12, there are included gasket assemblies 15 and 15', respectively. Each gasket assembly, for example assembly 15, comprises a pair of conical pyrophyllite gaskets 16 and 17 and a conical metallic gasket 18 interposed therebetween. As illustrated, either of the reaction vessel constructions shown in FIGS. 2 and 3, or modification thereof, may be inserted into space 14a which is shown defined by the faces of punches 11, 11' and gaskets 15, 15'.

Motion of either one of punches 11 and 11' toward the other will compress the gasket assemblies 15 and 15' and thereafter will compress the reaction vessel 14 disposed therebetween raising the pressure in the specimen in the reaction vessel 14 to a very high value. At the same time, electrical current is provided from a source (not shown) to flow via punch 11 and 11' through a suitable resistance heater (to be described below) in the reaction vessel 14, to heat the specimen.

Figure 2:
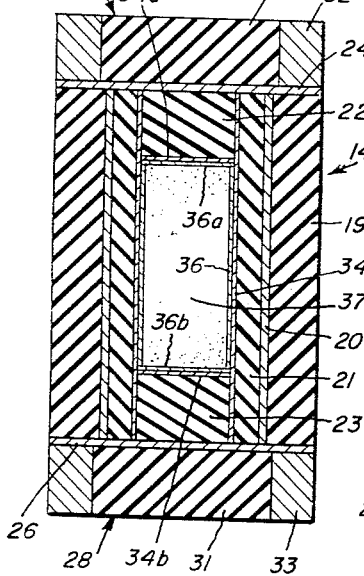
FIG. 2 is a vertical cross-section of a reaction vessel which may be utilized in the apparatus of FIG. 1.

Reaction vessel 14 is of the general type disclosed in U.S. Patent 3,031,269—Bovenkerk. As shown in FIG. 2, the outer element of vessel 14 is hollow pyrophyllite cylinder 19 measuring approximately 0.930 inch in length in one preferred configuration. Positioned concentrically within and adjacent to cylinder 19 is graphite electrical resistance heater tube 20 having a wall thickness of approximately 0.025 inch. Within the graphite tube 20 there is concentrically positioned alumina liner, or cylinder, 21. Opposite ends of liner 21 are fitted with the alumina plugs 22, 23 effectively closing the ends of alumina tube 21. Electrically conductive metallic end discs 24 and 26 arranged at each end of cyclinder 19 are disposed in contact with tube 20 and conduct electricity to heater tube 20. Adjacent each disc 24, 26 is an end cap assembly 27, 28 each comprising a pyrophyllite plug or disc 29, 31 surrounded by an electrically conductive ring 32, 33. The latter rings complete the electrical circuit between punches 11 and 11' and graphite heater 20 via the discs 24, 26. Disposed within cylinder 21 between alumina plugs 22, 23 is the charge element comprising concentrically arranged tubes 34 and 36 having ends 34a and 34b and 36a and 36b, respectively, defining chamber 37 wherein are received the charges or specimens to which the high pressures and high temperatures are to be simultaneously applied to effect the phase transformations described herein.

The materials of which tubes 34 and 36 and the ends therefor are composed should be relatively inert, for example, titanium, tantalum, zirconium, etc. Thus, in the construction of FIG. 2 elements 34, 34a and 34b may be tantalum and elements 36, 36a and 36b are titanium. These materials serve to seal off the specimen within and to absorb and prevent the entry of gases into the charge element. Such gases are generated from the pyrophyllite during compression.

Figure 3:
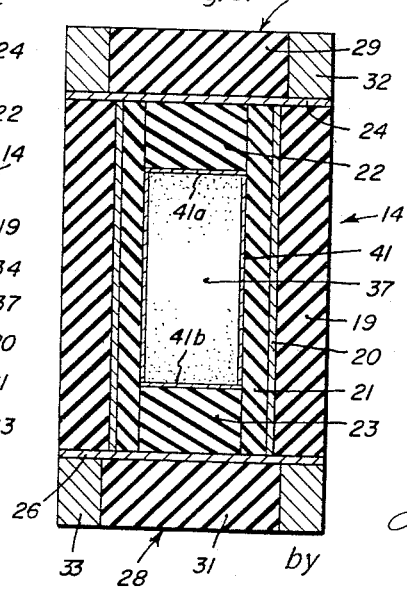
FIG. 3 is a modified reaction vessel which may be utilized in the apparatus of FIG. 2.

In the modified reaction chamber 14 shown in FIG. 3 only one tube liner and ends therefor are employed and with the exception of this tube 41 and ends 41a and 41b made of tantalum, titanium or zirconium, the reaction vessel construction is the same as in FIG. 2.

Other apparatus, such as the tetrahedral anvil type described in U.S. Patent 2,968,837—Zeitlin et al. may be used in the practice of this invention.

The method employed is as follows: a specimen of the parent magnesium compound is introduced and compacted into chamber 37; the reaction vessel 14 is assembled and inserted with the surrounding gasket material in the high pressure apparatus 10 in space 14a; reaction vessel 14 is then subjected to the pressures given below as required for the particular compound; after the desired pressure has been reached, the reaction vessel 14 with its enclosed specimen is brought to the desired temperature by electrical resistance heating; the requisite pressure and temperature are held for the desired time, usually 10 minutes or less; the electrical current to the reaction vessel 14 is cut off, the pressure is released and, after the appropriate cooling, the specimen is removed.

It has been observed that with each of the magnesium compounds described herein the phase transformation to the higher density form can occur in the solid state; that is, the transformations take place whether or not the specimens exposed to high pressure-high temperature conditions had melted. However, when the pressure and temperature conditions produce melting of the specimen higher rates of transformation and a larger grained product result.

The silicon compound of magnesium ($Mg_2Si$)

The starting material a blue solid exhibiting a metallic luster was an alloy of $Mg_2Si$ and $Si$ having an overall composition of 50 atomic percent magnesium and 50 atomic percent silicon. The density of the starting magnesium silicide ($Mg_2Si$) theoretically computed has a maximum value of 2.02 g./cc. and the substance has a resistivity in the order of 5 ohm-cm. The crystalline structure of the parent magnesium silicide is face-center cubic, anti-fluorite, space group symbol $F_m3_m$.

Upon exposure of magnesium silicide crystals to high pressure conditions (about 25 kb. and over) and high temperature conditions (about 900° C. and over), transformation to a denser phase occurs in 10 minutes or less with a shift from the parent face-center cubic to a hexagonal symmetry. Strong corroborative evidence of this shift has been obtained from metallographic examination of the specimens, which examinations have disclosed structures similar to those seen in metallographic examinations of samples of steel wherein it has been concluded that an orderly precipitation of hexagonal material occurs in an otherwise cubic crystal.

The density of the new and phase reflects an increase of about 15 percent or greater and the apparent resistivity increases to about $10^3$ ohm-cm.

EXAMPLE 1

About 200 mg. of the 50 percent Mg-50 percent Si substance was exposed to a pressure of about 55 kilobars (1 kb.=987 atmospheres) and a temperature of about 900° C. for 1 minute. A cooling period of about 5 minutes was allowed after which the converted material was removed.

The blue magnesium silicide was completely converted to a silvery solid having a density of at least 2.35 g./cc. and a crystal structure having an overall hexagonal symmetry. The relation between the old and new phases of the specimen appears to be one of anisometric collapse of the parent face-center cubic structure such that the layer planes of the new dense phase contain magnesium and silicon atoms in a puckered array.

X-ray diffraction films of the sample produced according to the Debye-Scherrer technique (described in the textbook "Structure of Metals" by C. S. Barrett, published in 1952 (2nd edition) by McGraw-Hill Publishing Co. in chapter 4, page 69 et seq.) disclosed a pattern completely different from that of the original material and these lines can be indexed on the basis of an overall hexagonal symmetry with $a=7.20$ A. and $c=8.12$ A. The apparent resistivity of the new phase is about $10^3$ ohm-cm. representing an increase in resistivity of about 200 fold. X-ray examination showed that the silicon phase of the alloy had not changed and that the modification wrought by the high pressure and temperature had modified the magnesium silicide pattern alone.

Following is a comparison of the X-ray diffraction pattern of the magnesium silicide before and after the application of high temperature and high pressure:

TABLE I.—X-RAY DIFFRACTION PATTERNS OF $Mg_1Si$

| d A. (Observed for new phase) | d A. (Parent form) |
|---|---|
| 5.8 | 3.70 |
| 5.0 | 3.20 |
| 4.25 | 2.25 |
| 4.0 | 1.92 |
| 3.7 | 1.84 |
| 3.55 | 1.59 |
| 3.40 | 1.466 |
| 3.30 | |
| 2.90 | |
| 2.80 | |
| 2.70 | |
| 2.55 | |
| 2.46 | |
| 2.34 | |
| 2.25 | |
| 2.20 | |
| 2.14 | |
| 2.10 | |
| 2.05 | |
| 2.03 | |
| 2.00 | |
| 1.90 | |

As may be readily seen in Table I, the diffraction pattern characteristic of the new form is completely different from that of the original material. Further, it has definitely been established that the new magnesium silicide phase is stable at room pressure and temperature and in the presence of atmospheric moisture over a period of many months.

The germanium compound of magnesium ($Mg_2Ge$)

Magnesium germanide normally crystallizes in the antifluorite lattice as silvery-looking crystals which when exposed in moist air (about 60–80 percent relative humidity) slowly become covered with a light blue film of oxide and disintegrate in about 4 to 5 weeks. This compound is easily prepared by melting together stoichiometric proportions of magnesium and germanium, preferably in vacuo, and then allowing the melt to solidify by cooling.

When samples of magnesium germanide are exposed to high pressure conditions (about 30 kb. and over) and high temperature conditions (about 600° C. and higher), transformation of these crystals to a denser phase occurs. Under temperature conditions which cause the magnesium germanide crystals to melt, the transformation to the new phase takes place more rapidly; however, transformation to the new dense phase will occur whether or not the material has been melted. Products obtained by exposure to high pressure and high temperature conditions wherein melting occurs contain unusually large grains of size 1–5 mm.

The initial face centered cubic ($F_m3_m$) lattice material converts to a new dense phase, which causes the diffraction of X-rays in a pattern expected from a crystal structure of hexagonal symmetry. Such studies show that the degree of compression along one body diagonal of the original cubic array has been about 20 percent.

The electrical properties of the new product also differ from the parent, that is, the apparent resistivity of the material is increased from about $10^3$ ohm-cm. to about $5 \times 10^4$ ohm-cm., indicating that not only has a change occurred in the atomic arrangement but a change has also occurred in the chemical bonding forces. An increase in density over the original density results equal to or greater than 10 percent. The new phase formed is stable for many months at room temperature and pressure and is not visibly affected by atmospheric moisture even after a period of more than three months.

EXAMPLE 2

About 200 mg. of the original crystals of magnesium germanide were subjected to a pressure of about 45 kb. and a temperature of about 1200° C. producing a densification of about 18 percent or more.

After release of the pressure and lowering of the temperature, it was revealed that a new phase, stable at room pressure, had been produced. Debye-Scherrer X-ray diffraction revealed that essentially total conversion of the specimen to the dense analog occurred during 10 minutes of high pressure-high temperature exposure. The material had a relatively large grain size, being about 1–2 millimeters across. The new phase yielded X-ray diffraction data which were indexed on the basis of a hexagonal lattice with $a=7.20$ A. and $c=9.58$ A.

A comparison of the X-ray diffraction lines of the original specimen of magnesium germanide and of the new dense phase reproduced below will show that the new phase is completely different in crystalline structure from the parent material.

TABLE II.—X-RAY DIFFRACTION PATTERNS OF $Mg_2Ge$

| $d$ A. (Observed for new phase) | $d$ A. (Parent form) |
|---|---|
| 6.2 | 3.65 |
| 3.60 | 3.2+ |
| 3.5 | 3.2 |
| 3.1+ | 2.25 |
| 2.90 | 2.00 |
| 2.72 | 1.92 |
| 2.60 | 1.85 |
| 2.50 | 1.70 |
| 2.42 | 1.59 |
| 2.30 | 1.46 |
| 2.06 | 1.42 |
| 2.05 | 1.30 |
| 1.98 | 1.225 |
| 1.90 | 1.15 |
| 1.80 | 1.12 |
| 1.72 | 1.075 |
| 1.68 | 1.06 |
| 1.60 | 1.01 |
| 1.56 | .97 |
| 1.47 | |

*The tin compound of magnesium* ($Mg_2Sn$)

Magnesium stannide normally crystallizes in the antifluorite lattice as silvery-looking crystals which when exposed to moist air slowly become covered with a light blue film of oxide. This compound is easily prepared by melting together stoichiometric proportions of magnesium and tin, preferably in vacuo, and then allowing the melt to solidify by cooling.

When samples of magnesium stannide are exposed to high pressure conditions (about 30 kb. and over) and high temperature conditions (about 600° C. and higher), transformation of these crystals to a denser phase occurs. Under temperature conditions which cause the magnesium stannide crystals to melt, the transformation to the new phase takes place more rapidly, however, transformation to the new dense phase will occur whether or not the material has been melted. Larger grains of the new phase material are obtained by exposure to high pressure and high temperature conditions wherein melting occurs. The initial face centered cubic ($F_m3_m$) lattice (anti-fluorite structure) upon conversion to the new dense phase has a structure which by X-ray diffraction data can be indexed satisfactorily on a hexagonal lattice.

These measurements indicate that the degree of compression along one body diagonal has been about 20 percent. Unusually large grain sizes, about 1–2 millimeters across of this material are obtained by this method and apparent resistivity of the material is decreased from about $10^2$ ohm-cm. to a value ranging from 10 to 50 ohm-cm. An increase in density over the original density equal to or greater than 18 percent occurs and the new phase formed is idefinitely stable at room temperature and pressure. It shows a high resistance to attack by atmospheric moisture.

EXAMPLE 3

About 200 mg. of the original magnesium stannide crystals were subjected to a pressure of about 45 kb. and a temperature of about 900° C. producing a densification of about 18 percent or more.

After release of the pressure and lowering of the temperature, it was revealed that a new phase stable at room pressure had been produced. Debye-Scherrer X-ray diffraction measurements revealed that essentially total conversion of a specimen to the dense analog had occurred by five minutes of high pressure-high temperature exposure. The material had a relatively large grain size, being about 1–2 millimeters across. The new phase has a hexagonal crystal lattice with $a=13.09$ A. and $c=13.44$ A.

A comparison of the X-ray diffraction lines of the original specimen of magnesium stannide and of the new phase are reproduced below:

TABLE III.—X-RAY DIFFRACTION PATTERNS OF $Mg_2Sn$

| $d$ A. (Observed for new phase) | $d$ A. (Parent form) |
|---|---|
| 4.50 | 3.91 |
| 3.80 | 3.38 |
| 3.70 | 2.39 |
| 3.11 | 2.04 |
| 2.65 | 1.95 |
| 2.60 | 1.69 |
| 2.50 | 1.55 |
| 2.26 | 1.51 |
| 2.20 | |
| 2.16 | |
| 1.90 | |
| 1.84 | |
| 1.80 | |
| 1.66 | |
| 1.44 | |
| 1.35 | |
| 1.21 | |

The diffraction pattern for the high density magnesium stannide is completely different from that of the original material, and the crystalline structure deduced therefrom is therefore different establishing a phase change.

What I claim as new and desire to secure by Letters Patent of the United States is:

1. A magnesium compound stable in the presence of atmospheric moisture having an increase in density over the less dense face-center cubic analog thereof of at least 10 percent and having a crystalline structure corresponding to a hexagonal lattice, said magnesium compound being selected from the group consisting of $Mg_2Si$, $Mg_2Ge$ and $Mg_2Sn$.

2. The process for preparing a high density form of magnesium silicide said high density form being stable and resistant to atmospheric moisture comprising the steps of:

(a) subjecting a specimen of magnesium silicide to a pressure of at least about 25 kb.

(b) simultaneously subjecting said specimen to a temperature of at least about 900° C. for at least 1 minute, and (c) releasing the specimen from the application of temperature and pressure.

3. The process for preparing a high density form of magnesium germanide, said high density form being stable and resistant to atmospheric moisture comprising the steps of:

(a) subjecting a specimen of magnesium germanide to a pressure of at least about 30 kb.,
(b) simultaneously subjecting said specimen to a temperature of at least about 600° C. for at least 1 minute, and
(c) releasing the specimen from the application of temperature and pressure.

4. The process for preparing a high density form of magnesium stannide, said high density form being stable and resistant to atmospheric moisture comprising the steps of:
(a) subjecting a specimen of magnesium stannide to a pressure of at least about 30 kb.,
(b) simultaneously subjecting said specimen to a temperature of at least about 600° C. for at least 1 minute, and
(c) releasing the specimen from the application of temperature and pressure.

5. Magnesium silicide stable in the presence of atmospheric moisture having an increase in density of about 15 percent over the less dense face-center cubic analog thereof, said high density form of magnesium silicide having a hexagonal crystalline lattice.

6. Magnesium germanide stable in the presence of atmospheric moisture having an increase in density of about 15 percent over the less dense face-center cubic analog thereof, said high density form of magnesium germanide having a hexagonal crystalline lattice.

7. Magnesium stannide stable in the presence of atmospheric moisture having an increase in density of about 15 percent over the less dense face-center cubic analog thereof, said high density form of magnesium stannide having a hexagonal crystalline lattice.

References Cited

UNITED STATES PATENTS

| 2,544,414 | 3/1951 | Bridgman et al. | 23—209.1 |
| 3,186,835 | 6/1965 | Bundy | 252—62.3 X |

OTHER REFERENCES

Bridgman et al., "Review of Modern Physics," vol. 18, pp. 19–27, 32–38 (1946).

Hannay, "Semiconductor," 1959, pp. 424–426.

MILTON WEISSMAN, *Primary Examiner.*